Aug. 5, 1958 V. DUQUESNE 2,845,969
WHEEL HOLDING AND CENTERING APPARATUS
Filed Dec. 22, 1954 2 Sheets-Sheet 1

INVENTOR.
VICTOR DUQUESNE
BY

Aug. 5, 1958 V. DUQUESNE 2,845,969
WHEEL HOLDING AND CENTERING APPARATUS
Filed Dec. 22, 1954 2 Sheets-Sheet 2
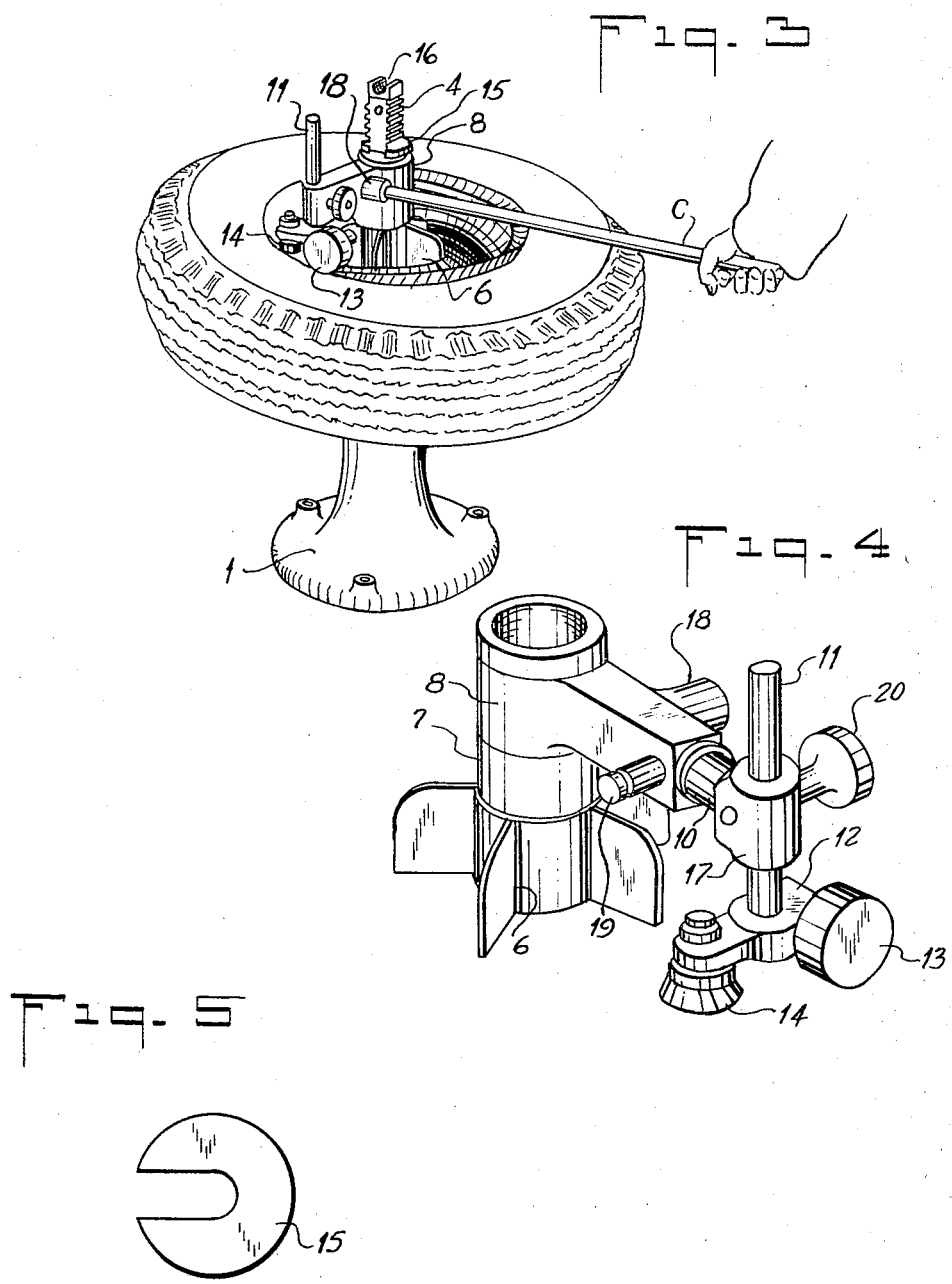
INVENTOR.
VICTOR DUQUESNE

United States Patent Office 2,845,969
Patented Aug. 5, 1958

2,845,969

WHEEL HOLDING AND CENTERING APPARATUS

Victor Duquesne, Antwerp, Belgium

Application December 22, 1954, Serial No. 476,965

Claims priority, application Belgium January 15, 1954

2 Claims. (Cl. 144—288)

The present invention refers to a wheel centering and locking apparatus intended to support a wheel of automotive vehicles during mounting or removing of tires on and from said wheels.

It is therefore an object of the invention to provide means affording the construction of an efficient apparatus of the aforesaid type facilitating the mounting of tires with a minimum of effort by the operator.

Another object of the present invention is to provide means for enabling automatic centering of different types of wheels for mounting tires on and removing tires from said wheels.

According to the invention a base or mounting plate of the apparatus supports a removable unit forming a centering device upon which the wheel body is to be placed. The centering is effected by means of a frusto-conical element upon which the wheel body may be engaged by its central opening, said conical element being axially movable together with the wheel body towards said base plate of the apparatus, means being further provided for locking the wheel body with the centering device upon the sustaining or base plate of the apparatus.

In one form of embodiment of the invention the centering conical element is controlled by a return spring and the proper weight of the wheel body is sufficient for axially moving the conical member so that the wheel body is centered automatically while coming in contact with a friction part supported by the centering device.

An apparatus according to the invention will be hereinafter described in combination with a rotary assembly for mounting a tire upon a wheel.

In the drawings:

Fig. 3 is a perspective view of a tire mounting device used with the apparatus of Fig. 1.

Fig. 4 illustrates on an enlarged scale and in perspective a part of the device of Fig. 3.

Fig. 5 is a locking disc used in connection with the invention.

Figure 1:
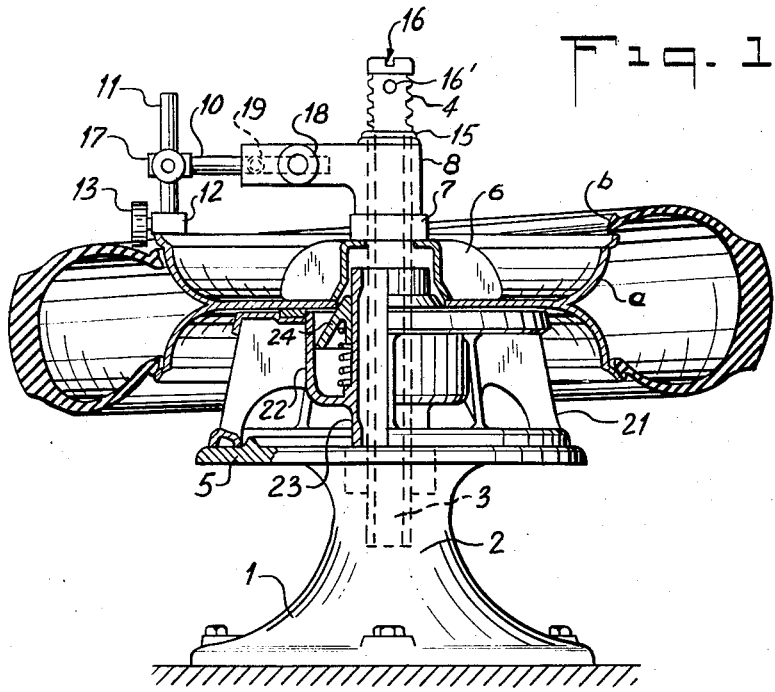
Fig. 1 is an elevation, partly in section, of a wheel centering and locking apparatus for mounting a tire.
Figure 2:
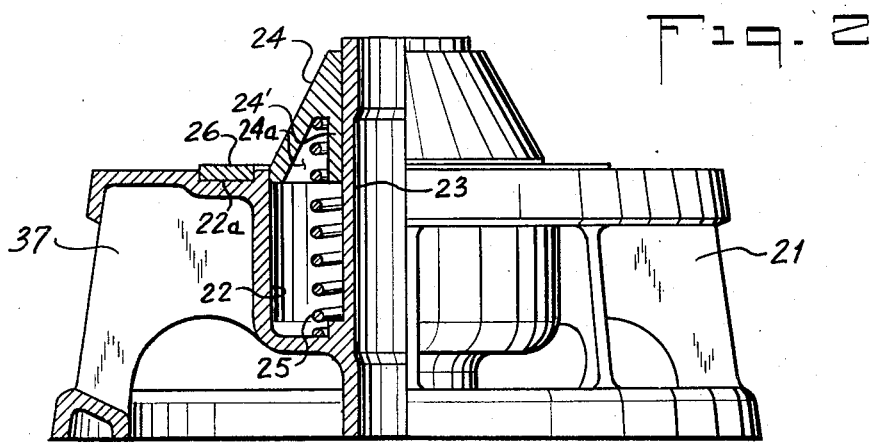
Fig. 2 is an elevation, partly in section, illustrating on a larger scale the centering means of the apparatus.

With reference to Figs. 1 to 4, the wheel centering and locking structure comprises a base column 1 with a mounting or base plate 5 presenting one or more concentric steps at its upper surface, said steps having a diameter corresponding to the standardized central openings of a great number of wheel bodies. In an axial threaded bore of the plate 5 is screwed the lower part of a threaded bar 3 which penetrates into the hollow part 2 of the column 1. The top portion of the threaded bar 3 has parallel transverse grooves 4 at opposite sides and at the upper end a notch 16 for locating an operating lever (not shown); underneath the notch 16 is provided a transverse bore 16' in which may be engaged a spindle or lever (not shown). The portion of the threaded bar having grooves 4 may be of a circular or square transverse section.

The device 21 for the automatic centering of the wheel body $a$ is supported by the plate 5 and is centered, either on a step portion of said plate, or by its hub 23 engaging an axial bore of the plate. The centering device 21 has a frusto-conical shape and its hub 23 is surrounded by a machined cylindrical wall or sleeve 22, from which spokes 37 forming radial fins extend. In the annular space between the hub 23 and the sleeve 22 is movably arranged a cone 24 provided with a skirt 24' which slides along the hub, while the peripheral edge of the cone is accurately guided along the sleeve wall 22; a helical spring 25 is located between the bottom of the sleeve 22 and the conical notch 24a formed between the cone 24 and its skirt 24'; this spring of weak power acts to lift the cone 24 at level with the upper surface of the device 21. An annular friction strip 26, made for instance from rubber, is located in a groove 22a cut in the upper surface of the device 21 and preferably coaxially therewith.

In placing the wheel body $a$ upon the device 21 while passing the cone 24 through the central opening of said wheel body, said cone is lowered against the action of the spring 25 and the wheel is automatically centered until it comes in contact with the friction ring 26.

A distance piece 6 in the shape of a sleeve provided with fins is located between the wheel body and a rotative assembly 8, an annulus 7 being arranged upon said distance piece, so as to keep the rotative assembly at convienient height. The parts 6, 7 and 8 have center bores which permit said parts to slide over the bar 3. The rotative assembly is locked upon the bar 3 by a key 15 (shown in detail in Fig. 5), of which the U-shaped arms engage a pair of opposite grooves 4. These different parts being arranged, by introducing a lever in the notch 16 or through the bore 16' and imparting a partial rotation to the bar 3, the wheel body will then be locked and centered upon the device 21, but the rotative assembly may be freely rotatable around the bar 3, ball bearings (not shown) being mounted within said hub.

The radial arm of the rotative assembly 8 has a lateral projection 18 for engagement with an operating lever $c$ and said arm has a bore for the engagement of the roller support 10 which is locked by the set screw 19. The roller support 10 ends in a head 17 in which is slidable a vertical bar 11, the heel 12 of which forms support for the movable rollers 13 and 14. The screw 20 locks the bar 11 in the required position for the manipulation of the rotative assembly. In such position the roller 13 slightly projects over the tire edge $b$ and at level with said edge and the roller 14 extends outwards and slightly inside the rim edge. The lower rim portion of the roller 14 forms an outwardly flaring bevel upon which the tire edge or bead $b$ may slide so as to progressively free the roller.

In Fig. 1 may be seen the position of the edges or beads of the tire with respect to the edge of the rim $a$, before starting the mounting of said tire upon the rim. For this mounting the tire is slightly inclined at the side of the rollers, the position of the latter being adjusted by means described hereinafter. By turning the rotative assembly by means of the lever $c$, as shown in Fig. 3, the rolling of the tire bead inside the rim is reliably performed without effort. The wheel body is afterwards reversed and the same operation is performed upon the second tire bead.

The combined tool outfit according to the invention affords by simple means the possibilities of mounting tires upon and removing them from different types of wheels, in a minimum of time, with small effort and with automatic manipulating accuracy.

Having thus described the invention, what is claimed as new and desired to be secured by Letters Patent, is:

1. In an apparatus for mounting and removing tires on and from a wheel body having a central opening; comprising a base provided with a mounting plate, a central, axially movable bar threaded in said mounting plate for holding said wheel body, wheel centering and locking means located upon said plate and surrounding said axially movable bar, a frusto-conical member guided within said centering and locking means in encircling relation to said axially movable bar and engaging said central opening of said wheel body, means for fixing said wheel body with said centering and locking means upon said base plate, said centering and locking means being shaped at one end to engage said mounting plate in centered position and including an axial hub, a machined sleeve surrounding said hub, said frustro-conical member being slidable along said hub and guided within the confines of said machined sleeve and being provided with a circular groove, and a helical spring located within said sleeve and engaging said circular groove of said member for the purpose of lifting said member to a level with the opposite end of said centering and locking means.

2. In an apparatus according to claim 1, said machined sleeve forming a part of and being spaced from said hub and terminating in an upper edge provided with a central opening, a friction ring located on said upper edge of said centering and locking means and disposed coaxially to said sleeve and projecting normally above said edge.

References Cited in the file of this patent

UNITED STATES PATENTS

| | | |
|---|---|---|
| 2,034,819 | Maulis | Mar. 24, 1936 |
| 2,233,371 | Smith | Feb. 25, 1941 |
| 2,481,926 | Henderson | Sept. 13, 1949 |
| 2,569,789 | Weaver | Oct. 2, 1951 |
| 2,692,013 | Duquesne | Oct. 19, 1954 |

FOREIGN PATENTS

| | | |
|---|---|---|
| 278,166 | Switzerland | Jan. 3, 1952 |
| 502,714 | Belgium | Aug. 1, 1952 |